United States Patent [19]
Cole, Jr.

[11] Patent Number: 4,708,701
[45] Date of Patent: Nov. 24, 1987

[54] CHAIN-BELT

[75] Inventor: Edward H. Cole, Jr., Ithaca, N.Y.

[73] Assignee: Borg-Warner Automotive, Inc., Troy, Mich.

[21] Appl. No.: 904,721

[22] Filed: Sep. 8, 1986

[51] Int. Cl.$^4$ .............................................. F16G 1/24
[52] U.S. Cl. .............................................................. 474/245
[58] Field of Search ............... 474/244, 245, 240, 242, 474/201, 206, 210, 214, 215, 212; 59/82, 88, 89

[56] References Cited

U.S. PATENT DOCUMENTS

| | | | |
|---|---|---|---|
| 989,719 | 4/1911 | Morse | 474/245 X |
| 1,868,334 | 7/1932 | Morse | 474/245 X |
| 1,974,338 | 9/1934 | McCann | 474/214 |
| 2,667,791 | 2/1954 | Bremer | 474/214 |
| 2,725,755 | 12/1955 | Riopelle et al. | 474/157 |
| 3,364,767 | 1/1968 | Bredschneider et al. | 474/245 |
| 3,720,113 | 3/1973 | van Doorne et al. | 474/245 |
| 3,916,709 | 11/1975 | Steuer et al. | 474/242 |
| 4,130,026 | 12/1978 | Jeffrey | 474/215 |
| 4,313,730 | 2/1978 | Cole, Jr. et al. | 474/201 |
| 4,344,761 | 8/1982 | Steuer | 474/245 |
| 4,464,152 | 8/1984 | Kern | 474/245 |
| 4,507,106 | 3/1985 | Cole, Jr. | 474/215 |
| 4,512,754 | 4/1985 | Cole, Jr. et al. | 474/245 |
| 4,516,963 | 5/1985 | Mott | 474/245 |
| 4,516,964 | 5/1985 | Laster | 474/245 |
| 4,516,965 | 5/1985 | Mott | 474/245 |

FOREIGN PATENT DOCUMENTS 0797312  7/1958  United Kingdom ............... 474/245

Primary Examiner—Stephen J. Novosad
Assistant Examiner—Thuy M. Bui
Attorney, Agent, or Firm—James A. Geppert

[57] ABSTRACT

A power transmission chain extending between driving means, such as pulleys or sprockets, to transfer torque wherein the chain is formed of a plurality of links having a substantially constant pitch and a plurality of serially arranged contact surfaces engaging contact surfaces of the driving means. The links are designed with longitudinally spaced symmetrical apertures positioned on the longitudinal center line of the link and pairs of asymmetric pins providing a pin and rocker joint between adjacent sets of links; the pairs of pins having facing rocking surfaces with variation of the contact point between rocking surfaces depending on the orientation of the two pins.

10 Claims, 11 Drawing Figures

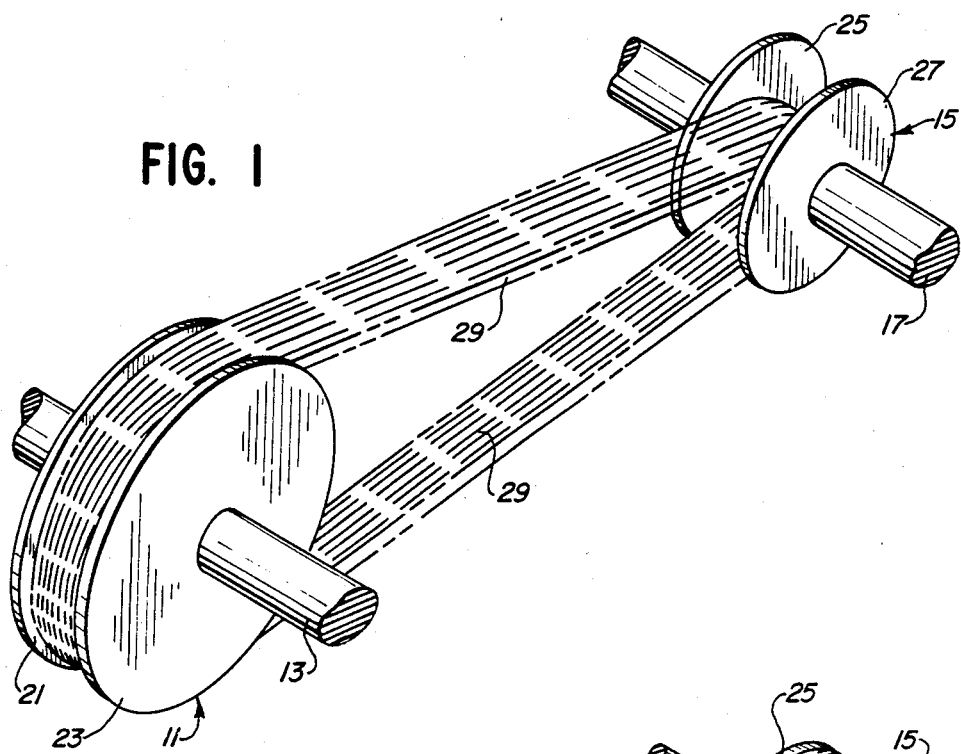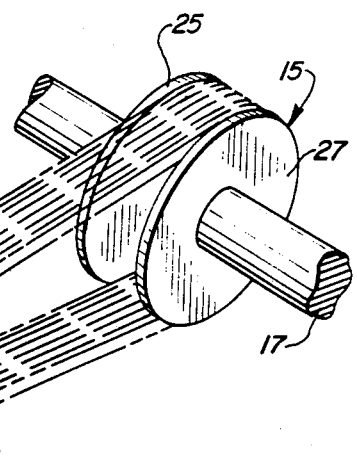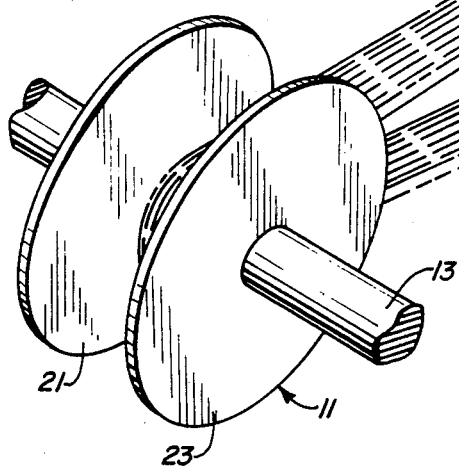

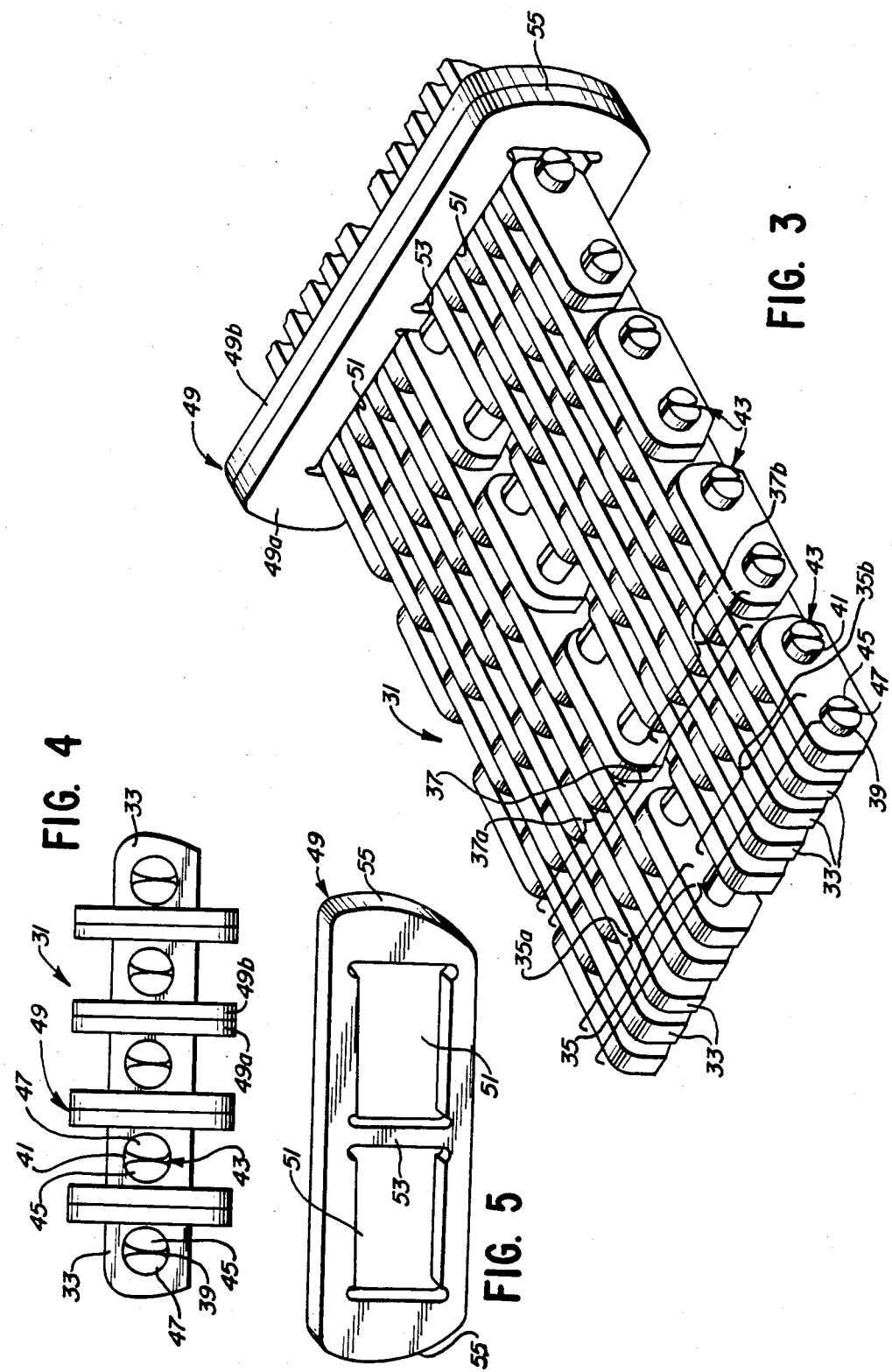

CHAIN-BELT

BACKGROUND OF THE INVENTION

Variable pulley transmissions for transferring torque from an input or drive shaft to an output or driven shaft have been used for some time. In these transmissions, a first pulley constructed of a pair of flanges is mounted on the input shaft such that at least one of its flanges is axially movable with respect to its other flange. A second, similarly constructed and adjustable pulley is mounted on the output shaft, and a flexible belt connects the two pulleys to transfer torque therebetween when the input shaft is driven. As the effective diameter of one pulley is changed, the effective diameter of the other pulley is simultaneously changed in the opposite direction to adjust the speed ratio between the input and output shafts in a smooth, continuous manner.

Automotive engineers have long recognized that the maximum operating efficiency of the engine could be achieved if the transmission could be controlled by adjusting to different loads and speed ratios, such that the engine is maintained and operated at its maximum efficiency operating conditions. This is not possible when a conventional geared transmission is teamed with an engine as the speed ratio is adjusted in discrete steps, rather than continuously. Accordingly, efforts have been directed to the use of a continuously variable transmission (CVT) of the type described above, and have resulted in commercial production of passenger cars in which a flexible, continuous rubber belt is used to drivingly connect the pulleys. Rubber belts are subject to wear by reason of the loads they must handle and operation under severe temperature, vibration and other adverse environmental conditions. To improve belt life, flexible belts of metal have been used and considerable effort is being expended to produce inexpensive and durable metal belts. Many of these metal belts are described in the patent literature.

Flexible metal belts for use with CVTs are generally of two varieties, those referred to as "push" belts and those referred to as "pull" belts. An example of a push belt is described in Van Doorne et al U.S. Pat. No. 3,720,113 and an example of a pull belt is described in Cole, Jr. et al U.S. Pat. No. 4,313,730. The belt shown in U.S. Pat. No. 3,720,113 comprises an endless carrier constructed of a plurality of nested metal bands and an endless array of load blocks longitudinally movable along the carrier. Each block has edge surfaces for engaging the pulley flanges of a pulley transmission to transmit torque between the pulleys. The push belt has been used in passenger cars on a limited basis and for some non-automotive, industrial applications. The pull belt of Cole, Jr. et al utilizes an endless chain as the carrier, the sets of links of which are pivotably connected by pivot means, shown as round pins. Generally trapezoidal (when viewed from the front) load blocks encircle the links; however the load blocks in the pull belt of Cole et al are constrained against longitudinal movement along the chain by the pivot means. The patent literature also describes a belt constructed of metal parts joined by pivot means in which the pivot means engage the pulleys of a CVT.

The push belt as described is relatively expensive to manufacture. The pull belt offers a less expensive alternative to the push belt. There are fewer problems in the manufacture of the belt because the links and load blocks (a single member or an assembly of relatively thin plates) can be stamped from sheet metal and the pivot means can be cut from extruded stock.

Aside from costs, a major concern of automotive engineers is noise generation by drive belts for pulley transmissions. Noise of a mixture of frequencies is less objectionable to humans than noise of pure frequencies. Currently an evaluation used by some automotive engineers is to rate noise generated by drive belts of the type described herein in a generally subjective manner by driving or riding in an automobile in which the belt is installed and listening to the generated noise. The noise is then rated on a numerical scale of 1 to 10 with the higher numbers indicating the less objectionable noise. Belts achieving a rating of about 6 and above are usually acceptable for use in automotive drives, and can be classified as being of commercial quality. Of course such belts must also be durable, so as to have a reasonable operating life.

Various ways have been suggested for constructing belts for use in a CVT which operate in such a manner to generate noise acceptable to humans, and a discussion of some of these ways will be found in the prior art. A description of some of the prior art follows.

In the Kern U.S. Pat. No. 4,464,152, a chainbelt constructed in a manner similar to the Cole et al patent, supra, has sound damping means interleaved with load block laminations.

Laster U.S. Pat. No. 4,516,964 discloses load blocks of different transverse widths, all of which contact the pulley flanges, but some at a different radial location on the pulley flanges from others, thus modifying the generated noise pattern.

In Mott U.S. Pat. No. 4,516,965, some load blocks do not contact the pulley flanges, or some load blocks are missing or "skipped", to thus modify the generated noise pattern.

Mott U. S. Pat. No. 4,516,963 discloses a random mixture of load block-pulley flange engaging areas to provide a pattern of random engagement thereof with the pulley flanges, and thus a modified generated noise pattern.

A suggested way to modify the generated noise pattern in a chain in which the pivot means drivingly contact the pulley flanges is to provide a drive chain constructed of a mixture of links of different pitches, such as U.S. Pat. No. 4,344,761, issued Aug. 17, 1982.

Morse U.S. Pat. No. 1,868,334, issued July 19, 1923, teaches constructing a chain for use with sprockets which provides a mixture of distances between adjacent centers of articulation or a mixture of "effective pitches" in order to "break up rythmic vibrations that sometimes cause trouble in chain drives". The patent is silent as to whether or not this "trouble" is noise related.

The invention to be described herein relates to chain and chain-belts which are used to connect sprockets or pulleys of power transmissions. The invention finds particular use for connecting the pulleys of a continuously variable transmission, commonly known as a CVT. In the description which follows, reference will be made to chain, it being understood that this includes not only toothed chains, also known as silent chain, but also structures known as chain-belts which comprise a carrier of connected chain links, pivot means connecting interleaved chain links, and drive blocks each of which encircles a set of links. The invention is primarily applicable to that variety of chain-belt known as pull belts.

In its broadest aspect, the chain is an endless loop and comprises a plurality of links, each defining a pair of longitudinally spaced apertures with one aperture in each link being transversely aligned with an aperture in the next adjacent link to thus form transverse rows of aligned apertures. Pivot means are received in each row of aligned apertures and the pivot means define spaced transverse articulation axes which are parallel to one another. The articulation axes for each link set are longitudinally spaced from each other.

When a chain as thus described is used in a CVT, load blocks encircle the links between each pivot means, the load blocks being generally trapezoidal in shape, when viewed from the front, with the opposing side edges adapted to engage the flanges of the pulleys of the transmission.

Preferably, the pivot means used in the chain comprise a pair of pins, each having the same cross-sectional configuration and differing, if at all, in length. If a clip is used for retaining the pivot means in the assembly of links and blocks, the pins can be substantially the same length. The pins as thus described are similar to that described and claimed in the Cole, Jr. U.S. Pat. No. 4,507,106, and the disclosure therein is incorporated herein by reference. Basically, the pins each have a first, front rocking surface defined by a large radius and a back or link contact surface defined by a plurality of lesser radii.

In chains of the type herein described, the links are arranged as sets. The number of links in a set (and of course the gauge of the metal from which the links are made) determines the ultimate width of the chain. For example, in a narrow chain, it is common to have a 7-8-7 etc. lacing or arrangement with load blocks constructed with a single window encircling each set of links. For a wider chain, a modified load block has been suggested, one with multiple windows such as shown in U.S. Pat. No. 4,512,754, the adjacent windows being separated by a strut. It has been proposed to lace the chain in a 4-5, 5-4, 4-5 etc. pattern, although other lacing arrangements can be used within the purview of the present invention.

The inventive concepts disclosed herein can also be applied to chains usable to connect toothed sprockets, and especially to chains known in the art as "silent" chains in which the links are constructed with at least a pair of projecting toes defined by flanks separated by a crotch. At least some of the flanks contact the sprocket teeth. The problem of noise generation is present in the silent chain-sprocket drive arrangement and is subjectively rated in a manner similar to that described above.

DEFINITIONS

When used herein, the below listed terms have the following meaning:

pivot means—a pair of members, such as a pin and rocker or pair of pins, extending through a row of aligned link apertures in two interleaved sets of links, to join the link sets and permit articulation thereof.

link—an elongated member having a pair of longitudinally spaced openings adjacent the opposite ends to receive a pivot means.

articulation axis—an axis of rotation defined by the operation of the pivot means; in a rocker joint, the axis is defined by the contact point between a pin and rocker.

axis of symmetry—an axis traversing an aperture or a joint member which divides the pin/aperture fit surface into two mirror image portions.

center of action—in a rocker joint, the geometric center of the rocking face.

line of pull—a line joining the centers of action in a chain or chain-belt when that part is tensioned.

sets of links—the links which are arranged transversely of one another with their apertures transversely aligned with one another.

joint radius—the distance from the axis of articulation of a link to the center of the pulley or sprocket.

load block—a one piece member or an assembly or laminate of a plurality of thin plates for encircling a set of links and shaped to engage the flanges of the pulleys of a pulley transmission to transfer radial load to the links and circumferential load to the pins.

SUMMARY OF THE INVENTION

In the present invention, the links of a chain belt are of a substantially constant pitch and arranged to insure a mixture of joint radii, so that tensions in the chain are not uniformly cyclical in nature, thus producing a noise pattern more acceptable to humans. As such the noise pattern is not as regular or repetitive as that produced by chains and/or chain belts of prior art constructions.

The present invention comprehends the provision of a link for a chain having a reference line generally parallel to the direction of link motion, wherein the link has a pair of longitudinally spaced apertures positioned on the reference line, and the centers of action of the pivot means are spaced from the reference line.

Various theories have been advanced as to the source of and reasons for noise or sound generation when a chain meshes with a sprocket or a chain-belt engages the flanges of pulleys of a pulley transmission, and the prior art is replete with discussions of these theories. A way to explain the invention is to relate noise genertion to "chordal action". The pitch line of a chain constructed of links and/or sets of links, the adjacent ones of which are joined by pivot means to permit the chain to articulate, on a driving means such as a sprocket or pulley, is polygonal rather than circular. This relationship results in that condition which is described in the prior art as chordal action. Chordal action manifests itself as a radial as well as a longitudinal component of motion in the chain as the chain enters the driving means. A cyclical tension occurs in the free strand beyond that of the mean tension providing the driving force, resulting in fluctuations in the bearing loads of the rotating body, i.e., the driving means. In a conventional chain in which the links are the same and the pitch of the links is the same (such as taught by the prior art), the tensions are uniformly cyclical in nature, so that the noise resulting from the cyclical action manifests itself in generated noise having rhythmic impulses or recognizable pure tones which can be objectionable to humans. The chain of the present invention provides a generated noise pattern that is chainged or modified in such a way as to be more acceptable to humans even though the changed or modified noise pattern has the same loudness as the unmodified noise pattern.

The present invention comprehends the provision of a chain-belt for a continuously variable transmission having rocker-type joints wherein the location of the center of the rocker radius (i.e., center of action) is modified by the use of asymmetric pins. These modifications allow the contact point on the rocking surfaces in the joint to be at different heights in various joints without moving the aperture location. By varying the height of the contact points in successive joints, the regular repetitive articulation action of a standard chain is eliminated, resulting in a belt that runs more quietly.

Also, the present invention comprehends a novel chain-belt where the links and pins provide a simple randomization of the centers of action for succeeding links while reducing strength and manufacturing limitations found in other noise randomization chains.

BRIEF DESCRIPTION OF THE DRAWINGS

FIGS. 1 and 2 are perspective illustrations of a continuously variable transmission (CVT) in the extreme drive ratios.

FIG. 3 is an isometric illustration of a segment of chain-belt for use in a CVT and constructed according to this invention.

FIG. 4 is a side view of a portion of the chain-belt of FIG. 3.

FIG. 5 is a perspective view of a load block plate usable in the chain-belt of FIGS. 3. and 4.

DESCRIPTION OF THE PREFERRED EMBODIMENT

Figure 6:
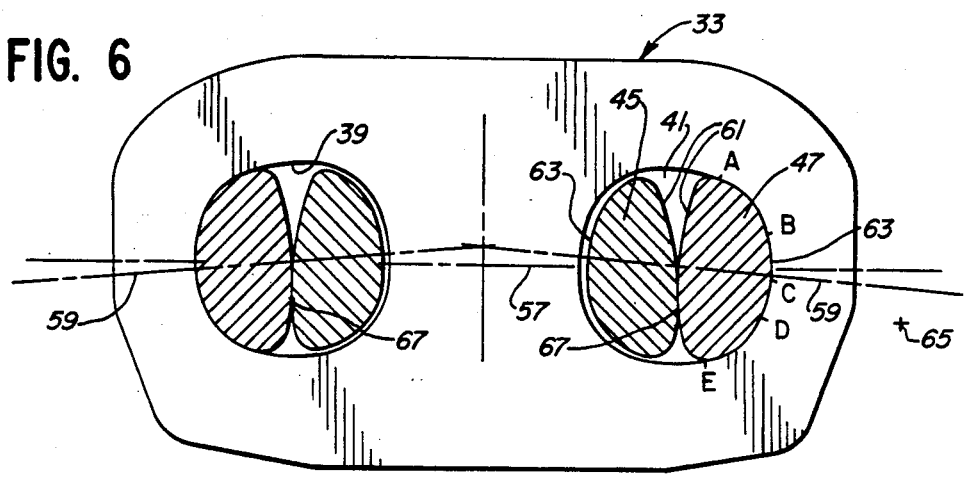
FIG. 6 is an elevational view of a symmetrical link and assymetric pivot means usable in a chain-belt of the present invention.

Referring more particularly to the disclosure in the drawings wherein are shown illustrative embodiments of the present invention, FIGS. 1 and 2 illustrate a typical CVT in overdrive and underdrive ratios. This CVT includes a first pulley 11 connected to a drive shaft 13 and a second pulley 15 connected to a driven or output shaft 17. The pulley 11 consists of flanges 21 and 23, at least one of which is axially movable relative to its respective shaft and to the other flange so as to change the effective diameter of the pulley relative to a power transmission belt 29 connecting the pulleys. Likewise, the pulley 15 consists of flanges 25 and 27, one of which is axially movable to the shaft 17 and to the opposite stationary flange. Generally, mechanical, hydraulic or electrical means, or mixtures thereof, are provided for simultaneously axially moving one flange of each pulley relative to the opposite flange to simultaneously vary the effective diameters in inverse relation, resulting in varying the drive ratio between the shafts.

FIGS. 3 and 4 illustrate assembly details of a chain-belt 31 constructed according to the present invention. This chain-belt (only a segment of a continuous loop with only a few load blocks assembled therewith being shown) comprises a plurality of symmetrical links 33 arranged as sets of links 35 and 37, each set being interleaved with the next adjacent set. The sets of links are divided into sub-sets 35A, 35B and 37A, 37B with the lacing being in a 10-8-10-8 pattern; although for narrower chains, a 6-8-6 pattern may be used.

Each link 33 defines a pair of longitudinally spaced symmetrical apertures 39 and 41. The apertures in a set of links are transversely aligned with one another to form rows of apertures and, when interleaved, one row of apertures of a set of links is transversely aligned with a row of apertures in the interleaved adjacent set of links. Pivot means 43 received in the aligned apertures joins the interleaved sets of links. Pivot means 43 are illustrated as rocker joints comprising a pair of asymmetric pins 45,47 acting as a pin and rocker for articulation of adjacent links. In an aperture or group of apertures, the asymmetrical pins 45,47 are identical in cross section and, when installed, are reversed relative to each other to provide facing rocking surfaces, the specific pin construction and arrangement being discussed later.

A load block 49 (FIG. 5) encompasses each set of links between adjacent pivot means 43, and each load block is formed of one or more plates, illustrated as a pair of plates 49A,49B in FIGS. 3 and 4, which can be stamped from strip or sheet stock. Load blocks 49 are generally trapezoidal in shape when viewed from the front and each defines a pair of windows 51, each window encircling a sub-set of links. The windows 51 are separated by a central strut 53 joining the top and bottom of the block. The blocks have opposed edges 55 adapted to engage the flanges of the pulleys in a CVT, and may be of a configuration such as shown in U.S. Pat. No. 4,313,730 or in copending application Ser. No. 656,282, filed Oct. 1, 1984. It is to be understood that a complete chain-belt 31 comprises a continuous loop of joined sets of links constituting a tension member with a load block encircling each of the sets of links.

FIG. 6 discloses an enlarged view of the link 33 having symmetrically tilted openings 39 and 41 located on a center or reference line 57 longitudinally through the link, such as shown in U.S. Pat. No. 4,507,106. The axes of symmetry 59,59 of the two apertures are slightly rotated relative to the longitudinal center line or reference line 57 of the link 33. Each pin 45,47 however, has an arcuate rocking face 61 of a constant radius and a back surface 63 formed of symmetrical surface areas defined by progressively smaller radii outwardly in two directions, such that arcs ABC and EDC, which together comprise the "fit" side of the pin remains unchanged; the axis of symmetry of the fit surface 63 passing through point C; the axis of symmetry of back surface 63 coinciding with axis of symmetry 59 for the opening 39 or 41. Both the axis of symmetry of fit surface 63 and the axis of symmetry 59 of the aperture are tilted with respect to reference line 57, and the center of action 65 of the pin rocking surface 61 is offset from the axis 59. Thus, the center of action 65 of pin 45 is offset from the axis of symmetry of fit surface 63 as seen in FIG. 6.

Figure 7:
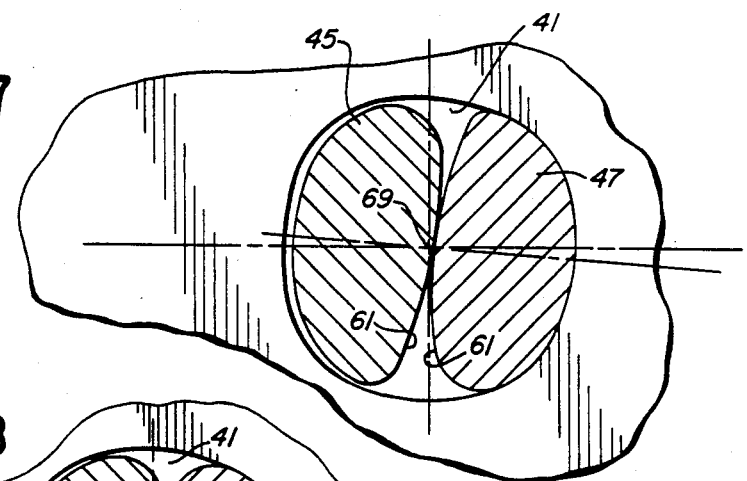
FIG. 7 is a partial elevational view of an aperture in a link similar to FIG. 6 but with the assymetric pin and rocker joint having an alternate position.
Figure 8:
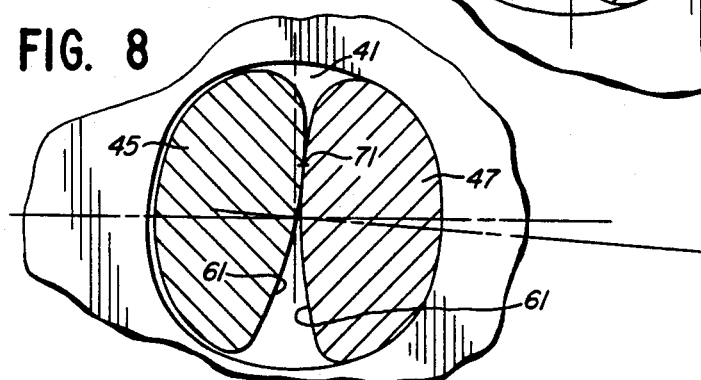
FIG. 8 is a partial elevational view of a link similar to FIG. 7, but showing a third position of the pin and rocker joint.
Figure 9:
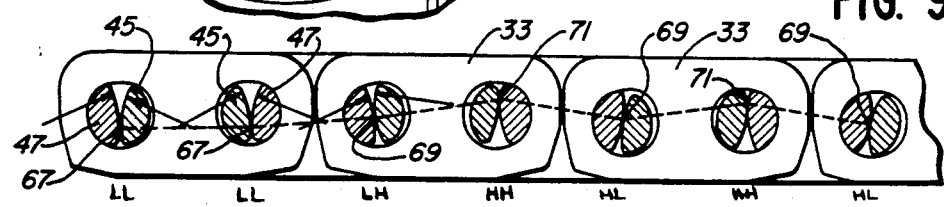
FIG. 9 is an elevational view of a portion of a chain-belt showing the various positions of the pivot pins in the chain.

If the pin 45 were inserted into the aperture "upside down", the center of action 65 would be offset from the axis of symmetry 59 in the opposite direction. Thus, a pin and rocker combination may have varying contact points 67 (FIG. 6), 69 (FIG. 7) or 71 (FIG. 8) depending on the positioning of each of the two pins 45,47, one being reversed relative to the other. As seen in FIG. 9, both pins 45,47 may be inserted right-side up (L,L) to provide a low contact point 67 (FIG. 6), one pin may be turned upside-down relative to the other (L,H) or (H,L) to provide a generally central contact point 69 (FIG. 7)

or both pins may be upside-down (H,H) to provide a high contact point 71 (FIG. 8).

The use of an asymmetric pin provides simplicity in manufacture and assembly of the chain. The links 33 are of a standard symmetric design and the pins 45,47 while asymmetric, are of a single type or design. Thus, there is less sorting of parts and orientation difficulty than in other randomizing chains, such as copending application Ser. No. 703,359. By inserting the asymmetric pin pairs in different orientations, as shown in FIG. 9, many types of articulation action are achieved. If a particular pin and link pattern was known to give optimum noise reduction, but slight variations from that pattern were also acceptable, an automatic assembly machine could make a rare sorting error without impairing the function of the belt or impeding the assembly. On the other hand, a rare error in sorting or assembling a random aperture height or random aperture tilt belt as described in application Ser. No. 703,359 would be much more likely to jam the assembly machine and/or result in an unacceptable product being built.

Figure 10:
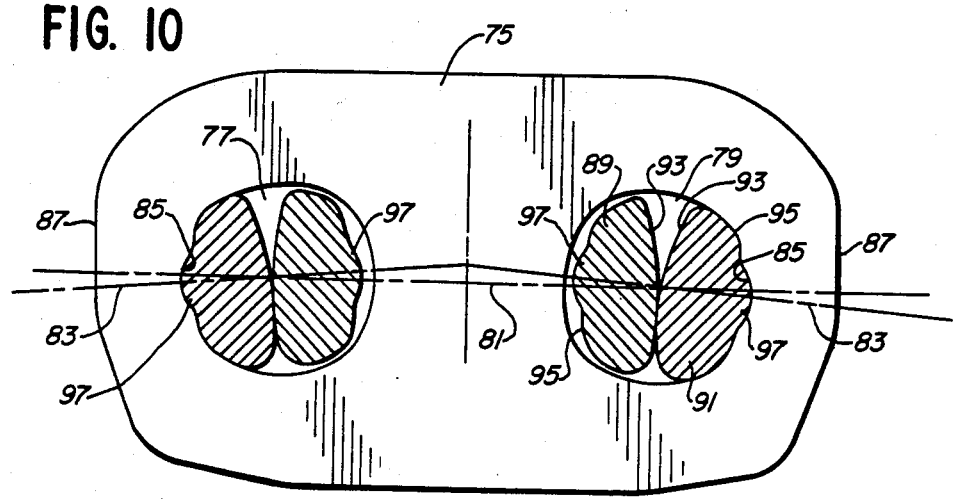
FIG. 10 is an elevational view of a symmetrical link and assymetric pins showing an alternative form of pin and aperture therefor.

FIG. 10 discloses an alternative form of pin and aperture for a symmetric link 75 having a pair of spaced apertures 77,79. Each aperture is positioned on the center line 81 of the link and tilted approximately 4° to provide an axis of symmetry 83. Each aperture is generally circular except for a curved recess 85 in the surface adjacent an end 87 of the link. Each asymmetric pin 89,91 has an arcuate rocking surface 93 and a symmetrical back or link contact surface 95 with a central curved bulge or projection 97, one of which is complementarily received in the recess 85. Cooperating projection 97 and recess 85 prevents relative rotation between the pin 91 and link 75, while the pin 89 is free to rock on the curved rocking surface of pin 91. As in the previous embodiments, the axis of symmetry of rocking surface 93 of pin 91 does not coincide with the axis of symmetry of the back surface 95 so that the center of action of pin 91 is offset from the axis of symmetry 83 of the link aperture.

Figure 11:
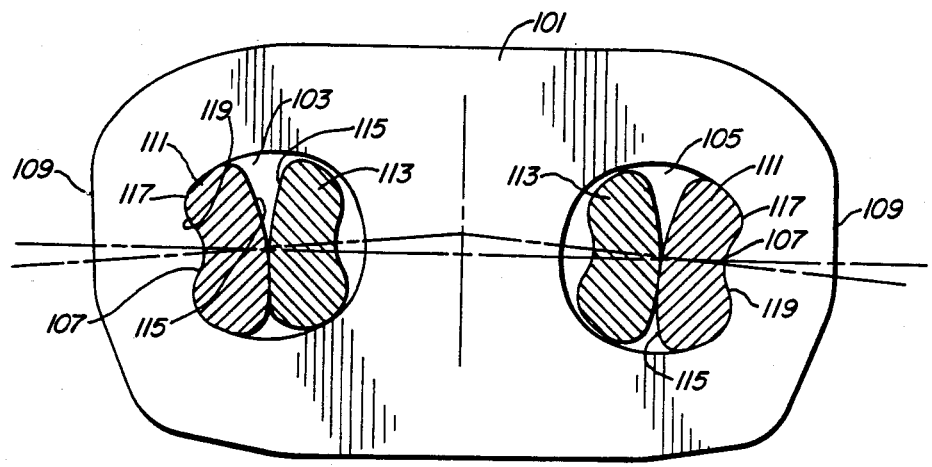
FIG. 11 is an elevational view similar to Figure 10, but showing a third form of assymetric pin and aperture.

FIG. 11 discloses a third embodiment of pin and aperture fit for a symmetric link 101 having spaced apertures 103,105. Each aperture is generally round except for an inward curved bulge or projection 107 on the edge adjacent the end 109 of link 101. Likewise each pin 111,113 is formed with a curved rocking surface 115 and a back or link contact surface 117 having a curved central recess 119, one of which accommodates the bulge 107; the pin 111 being seated on the aperture surface with the bulge 107 to prevent relative rotation therebetween. Because of the spacing in the aperture, the opposite pin 113 does not have its recessed back surface 117 interact with the aperture other than the rocking action of pin 113 relative to pin 111.

Obviously, where the axis of symmetry of the aperture and of the fit surface of a pin are tilted 3° to 4° as shown in the above examples, the center of action of the rocking face of either a symmetric or asymmetric pin will be offset from the center of reference line for the link; however, they are all offset the same amount for symmetric pins. On the other hand, the asymmetric pins provide variation in the amount of offset from the reference line from pitch to pitch and are also offset from the axis of symmetry for the link aperture. Although shown with apertures having tilted axes of symmetry, it is obvious that the use of asymmetric pins for apertures having their axes of symmetry coincident with the reference or center line for the link would also provide the advantages enumerated above.

I claim:

1. In a power transmission chain, the combination of a plurality of links each defining a pair of longitudinally spaced apertures on a longitudinal center line therefor, each aperture having an axis of symmetry, one of the apertures in each link being transversely aligned with an aperture in the next adjacent link to form transverse rows of aligned apertures, and pivot means received in each row of apertures, said pivot means defining spaced transverse articulation axes which are parallel to one another, the improvement comprising said pivot means including pairs of asymmetric pins in the apertures of the link, with one pin being reversed relative to the other pin to provide facing rocking surfaces, at least one of said pairs of pins having a symmetrical back surface with an axis of symmetry coincident with the corresponding aperture axis of symmetry, wherein the center of action of each said rocking surface is offset from the axis of symmetry of the aperture in which said respective pin is seated.

2. A chain as recited in claim 1, wherein the longitudinal spacing of the apertures in each link is the same.

3. A chain as recited in claim 1, in which the pairs of pins each have the same cross-section.

4. A chain as recited in claim 1, wherein the apertures in each link are symmetrically rotated so that each link has overall symmetry about a vertical axis.

5. A chain as recited in claim 3, in which each said pin has an asymmetrical rocking surface formed by a radius from the associated center of action.

6. A chain as recited in claim 5, wherein each pin may be inserted right-side-up or upside-down in the aperture, thus altering the contact point relative to the opposite pin.

7. A chain as recited in claim 5, wherein each pin member is defined by an arcuate rocking surface defined by a relatively large radius from said center of action and a back surface defined by progressively smaller radii outwardly in two directions from its axis of symmetry.

8. A chain as recited in claim 1, characterized in varying the joint radii of at least some of said chain links by altering the contact point between a pair of facing pins.

9. A chain as set forth in claim 3, wherein each pin has a symmetric back surface including a central curved projection and each aperture has a curved recess complementarily receiving said projection for said pin nearest the end of the link.

10. A chain as set forth in claim 3, wherein each pin has a symmetric back surface with a central curved recess therein, and each said link aperture includes a curved projection complementarily received in said pin recess of the pin nearest the end of the link.

* * * * *